United States Patent
Hu et al.

(10) Patent No.: US 9,544,667 B2
(45) Date of Patent: Jan. 10, 2017

(54) BURST SWITCHING SYSTEM USING OPTICAL CROSS-CONNECT AS SWITCH FABRIC

(71) Applicant: NEC Laboratories America, Inc., Princeton, NJ (US)

(72) Inventors: Junqiang Hu, Davis, CA (US); Philip Nan Ji, Plainsboro, NJ (US); Ting Wang, West Windsor, NJ (US); Yawei Yin, Princeton, NJ (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 14/506,627

(22) Filed: Oct. 4, 2014

(65) Prior Publication Data

US 2015/0104171 A1 Apr. 16, 2015

Related U.S. Application Data

(60) Provisional application No. 61/890,438, filed on Oct. 14, 2013.

(51) Int. Cl.
*H04J 14/00* (2006.01)
*H04Q 11/00* (2006.01)

(52) U.S. Cl.
CPC ... *H04Q 11/0066* (2013.01); *H04Q 2011/0064* (2013.01)

(58) Field of Classification Search
CPC ............. H04Q 11/0066; H04Q 2011/0064
See application file for complete search history.

(56) References Cited

U.S. PATENT DOCUMENTS

| | | | | |
|---|---|---|---|---|
| 6,721,315 B1* | 4/2004 | Xiong | ............. | H04L 49/254 370/389 |
| 7,519,055 B1* | 4/2009 | Zheng | ............. | H04L 45/00 370/389 |
| 7,889,729 B2* | 2/2011 | Yun | ............. | H04L 12/5693 370/351 |
| 8,687,629 B1* | 4/2014 | Kompella | ......... | H04L 49/1515 370/386 |
| 8,861,539 B2* | 10/2014 | Dong | ............. | H04L 49/101 370/390 |
| 8,897,133 B2* | 11/2014 | Lin | ............. | H04L 49/45 340/2.21 |
| 2004/0052527 A1* | 3/2004 | Kirby | ............. | H04Q 11/0005 398/57 |
| 2004/0151115 A1* | 8/2004 | Poppe | ............. | H04L 47/10 370/230.1 |
| 2005/0073951 A1* | 4/2005 | Robotham | ......... | H04L 49/254 370/229 |
| 2005/0089054 A1* | 4/2005 | Ciancaglini | ....... | H04L 49/3045 370/412 |

(Continued)

*Primary Examiner* — Ken N Vanderpuye
*Assistant Examiner* — Amritbir Sandhu
(74) *Attorney, Agent, or Firm* — Joseph Kolodka

(57) ABSTRACT

A switching system includes one or more line card for input processing, forwarding, queuing, and scheduling data, the line card having a tunable laser to select a wavelength according to the packets' destination for a given burst of packets, so that the burst is switched to a desired destination and sent all-optically to a connected interface; an all-optical switch fabric coupled to the line card to perform wavelength switching; and a centralized arbitrator that resolves the contention from different input ports.

20 Claims, 5 Drawing Sheets

(56) References Cited

U.S. PATENT DOCUMENTS

| | | | |
|---|---|---|---|
| 2005/0152351 A1* | 7/2005 | Wang | H04Q 11/0005 370/387 |
| 2006/0120342 A1* | 6/2006 | Christensen | H04L 45/00 370/351 |
| 2006/0126512 A1* | 6/2006 | Jain | H04L 47/10 370/236 |
| 2006/0209825 A1* | 9/2006 | Carroll | H04L 12/66 370/390 |
| 2007/0006056 A1* | 1/2007 | Lehner | G01R 31/31853 714/727 |
| 2007/0201870 A1* | 8/2007 | Cohen | H04Q 11/0005 398/51 |
| 2008/0260383 A1* | 10/2008 | Zhong | H04J 14/0209 398/50 |
| 2009/0141719 A1* | 6/2009 | Roy | H04J 3/0685 370/390 |
| 2009/0245135 A1* | 10/2009 | Huang | H04L 49/352 370/254 |
| 2013/0084062 A1* | 4/2013 | Hu | H04L 49/10 398/2 |
| 2013/0235870 A1* | 9/2013 | Tripathi | H04L 45/56 370/390 |
| 2013/0266309 A1* | 10/2013 | Binkert | H04L 49/253 398/19 |
| 2013/0266315 A1* | 10/2013 | Drury | H04J 14/0254 398/48 |
| 2014/0178066 A1* | 6/2014 | Patel | H04B 10/27 398/45 |
| 2014/0255022 A1* | 9/2014 | Zhong | H04Q 11/0005 398/16 |
| 2014/0334818 A1* | 11/2014 | Mehrvar | H04Q 11/0066 398/51 |
| 2016/0119058 A1* | 4/2016 | Wang | H04B 10/272 398/58 |

* cited by examiner

BURST SWITCHING SYSTEM USING OPTICAL CROSS-CONNECT AS SWITCH FABRIC The present application claims priority to Provisional Application 61/890,438 filed Oct. 14, 2013, the content of which is incorporated by reference.

BACKGROUND

Most of the current high-capacity switches use a flow that goes from input to switch fabric to output solution, of which the input side performs O/E conversion, forwarding/policy enforcement, and segmentation/queuing/scheduling; switch fabric provides the switching path that connects the input and output ports, and usually includes an arbitrator/scheduler to avoid contention; output side reassembles the packets, performs additional output scheduling, and converts signal from electrical to optical. Such switches face potential issues such as:

1) Electrical switching involves high-speed electrical connection from input/output ports to the switch fabric, such connection has limited connection distance and requires a single chassis or pizza-box type layout, so the switching scale and physical arrangement is limited; and 2) The high-speed electrical connection is usually achieved through a serializer/deserializer (SerDes, or called transceiver), which provides parallel interface to the device's internal processing and serial interface for PCB routing to fabric interface. Such SerDes and the crossbar switch fabric consume a lot of power, in particular when the system has large switching capacity.

Optical burst switching network is one solution for the aforementioned problem, in that the edge router/switch assembles the packets into bursts, setup the path along the network, and then transmit the burst. In one variation, the burst is assembled in the intermediate switching node which performs all-optical switching plus burst assembly function.

Optical label switching is another solution, which uses a short optical label for control and configuring the switching path, while the accompanied data packet or burst is switched all optically. In such switching system, the label is extracted and processed electrically to get the destination and policy information; the switch fabric is configured based on this processing result, and then the data packet/burst is fed into the switch fabric and switched to the destination output port.

Another solution is using external wavelength switch to provide fixed connection from one switch to another, either to increase the switching scale, or to bypass the electrical processing for large volume of traffic.

SUMMARY

In one aspect, a switching system uses centralized arbitrator to resolve output port contention; assembles the packets in a burst according to grant information and input scheduling result, uses tunable laser at input port, and modulates the bursts of packets into the specific wavelength to reach a destination; uses optical switch fabric to connect burst of packets from input to output port.

In one embodiment, the switched optical burst is directly sent to the interface of the connected system or network interface card (NIC). That interface is capable of receiving in burst mode.

In another embodiment, the switched optical burst is timing adjusted and/or re-framed, and sent in continuous mode to the connected interface.

In yet another embodiment, the system has electrical and optical hybrid switch fabric, provides burst switching for some ports through the optical fabric, and traditional processing/switching path for other ports.

In a further embodiment, the input port/line card and the switch fabric (and the arbitrator) are physically located in different places, for the flexibility of physical layout.

Advantages of the above system or competitive/commercial value of the solution achieved by the system may include one or more of the following. The system is lower-cost, power efficient, and flexible in connection. Optical switching avoids high-speed electrical connection from input/output ports to the switch fabric, and provides long connection distance and the switching scale and physical arrangement is better than electrical switches. There is no need for high power SerDes and the crossbar switch fabric. Additionally, the system has large switching capacity.

DETAILED DESCRIPTION

Figure 1:
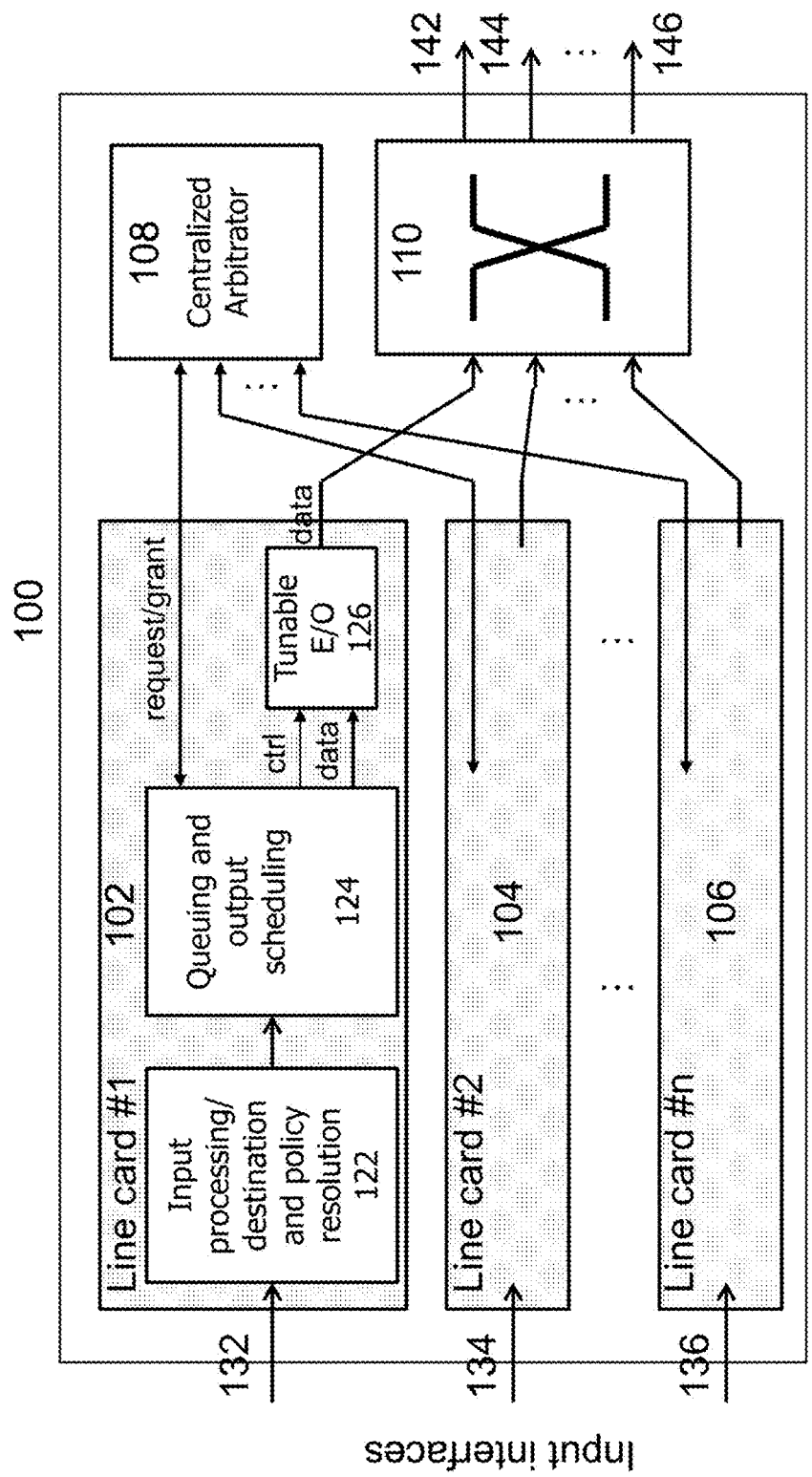
FIG. 1 shows an exemplary system architecture for the present invention.

FIG. 1 shows an exemplary system architecture of the present invention. System 100 switches packets received from input ports (such as 132, 134, and 136) to the output ports (such as 142, 144, and 146) and performs necessary processing. In high level, the system contains line cards (such as line card 102, 104, and 106), centralized arbitrator 108, and switch fabric 110. Unlike the traditional switches that has output processing, the output side of switch 100 has only an interface that is coupled directly to the output of the switch fabric. Inside each line card, for the received packet, module 122 performs input processing such as packet header/length checking and the modification for related fields; destination and policy resolution, which involves table lookup to get the packets' destination and enforced policy (e.g., allowed to pass through or not; class of service; quality of service; etc.). Because there is no output processing, the modification to related fields like destination MAC address is all handled in this module. Queuing and output scheduling module 124 is similar to those in traditional switches, except that the scheduling and outputting are in burst mode. Module 124 sends request to centralized arbitrator 108 with its queue status and service class. The request can be either the report/update about the queue status, or that to request a single burst slot for the fabric access. Arbitrator 108 resolves the contention for the requests to the same output port, and sends back the granted output port and time slot to each input port. Upon receiving of a grant, for the assigned time slot, module 124 tunes transmitter 126 to the given wavelength, and reads out packets from the corresponding queue to drive the optical transmitter. The optical signal that carries the burst of packets will pass through the optical cross-connect (WXC) 110 and reach the proper output port. WXC 110 performs all-optical switching in that a particular wavelength from any input ports will be switched to a dedicated output port.

Centralized arbitrator 108 coordinates the burst requests from all the ports. The arbitration can be either asynchronous, or using fixed and synchronous time slot. For asynchronous case, 108 returns with the granted start time, duration, and the granted destination port. Synchronous arbitration is to have the whole system running on synchronized time slot, each time slot is for one burst, and the arbitrator responses with (either implicitly or explicitly) the granted time slot plus the destination port. For an authorized time slot, the source port tunes the laser to the destination's wavelength, and reads from the corresponding buffer.

In terms of arbitration, in one embodiment, the arbitrator uses priority-based solution, with priority considered while it performs scheduling. If the source port does not have the packets of that priority to fill in the complete time slot, it may use sub-scheduling to fill it up using packets of other priority. Alternatively, the arbitrator schedules the request in aggregated way without considering service class, either equally distribute the bandwidth (like in round-robin mode), or using weight-based scheduling that uses the total allocated bandwidth between each source and destination ports as the weight. In such case, the scheduler in the source port further distributes the granted bandwidth to different queues, and assembles the burst based on this distribution. In one embodiment, the source port organizes the queue using traditional VOQ (Virtual Output Queue) method, and a burst is assembled during the time it is being read out.

The interface of switch 100 can be connected to either another switch or the network interface card (NIC). The receiver of such interface works in burst mode and is able to receive the burst of packets originated from different source ports.

Figure 2:
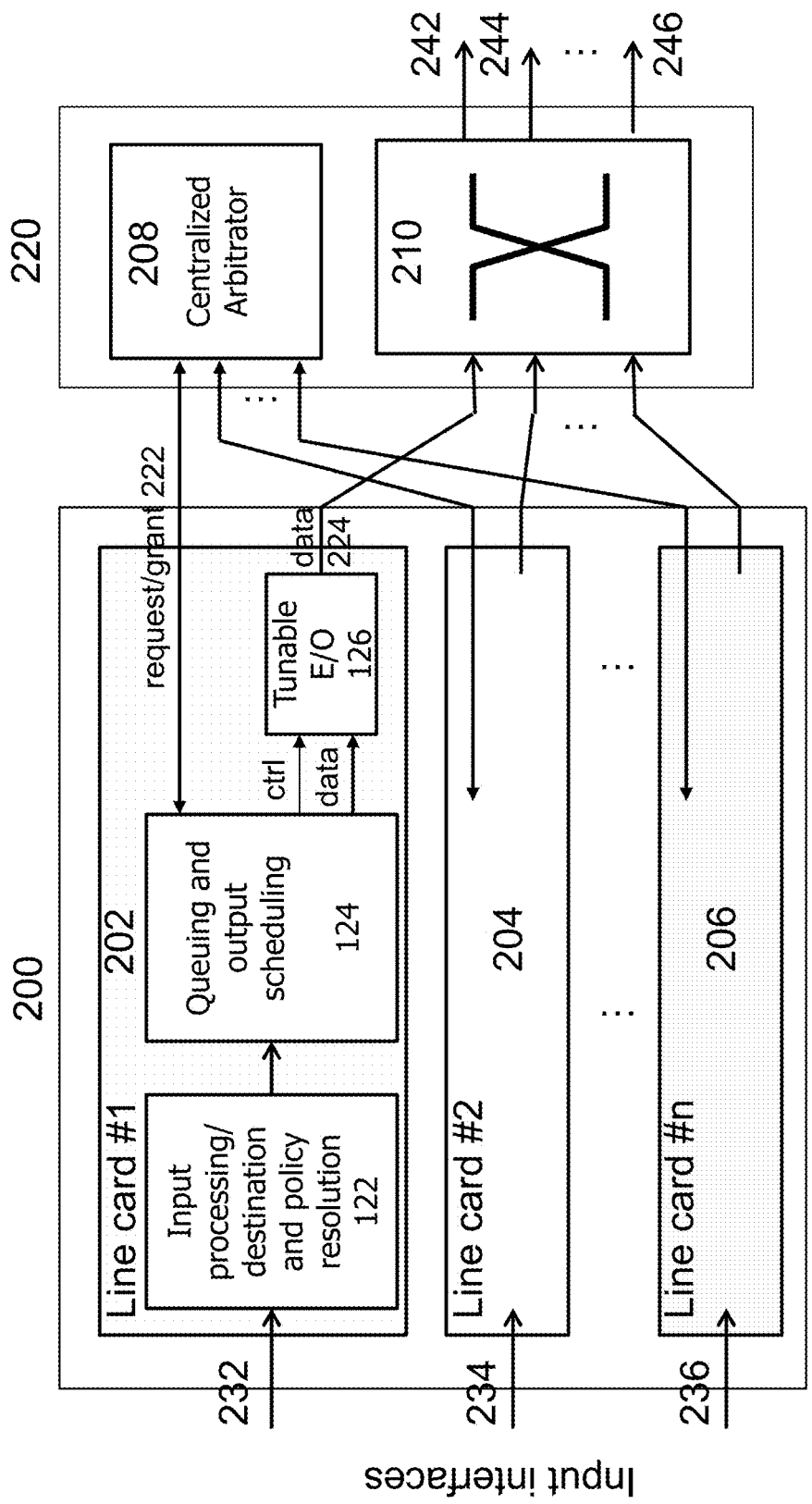
FIG. 2 shows an exemplary arrangement where a line card and switch-fabric/arbitrator are physically separated.

In one embodiment, the switch fabric and arbitrator of system 100 can be physically separated from the line cards, in that multiple line cards can be grouped in one system (called line card system) and the fabric plus arbitrator can be in another system (called fabric system) that serves multiple line card systems. As shown in FIG. 2, line card system 200 contains line cards (such as line card 202, 204, and 206) only, while fabric system 220 has switch fabric 210 and centralized arbitrator 208. Request/grant 222 are either through dedicated cable, or using the same fiber (with different wavelength) as the data signal 224. Arbitrator 208 may send back grant either in broadcast mode for all the systems, or in unicast mode with a dedicated transmitter for each line card, or the combination of these two solutions.

Figure 3:
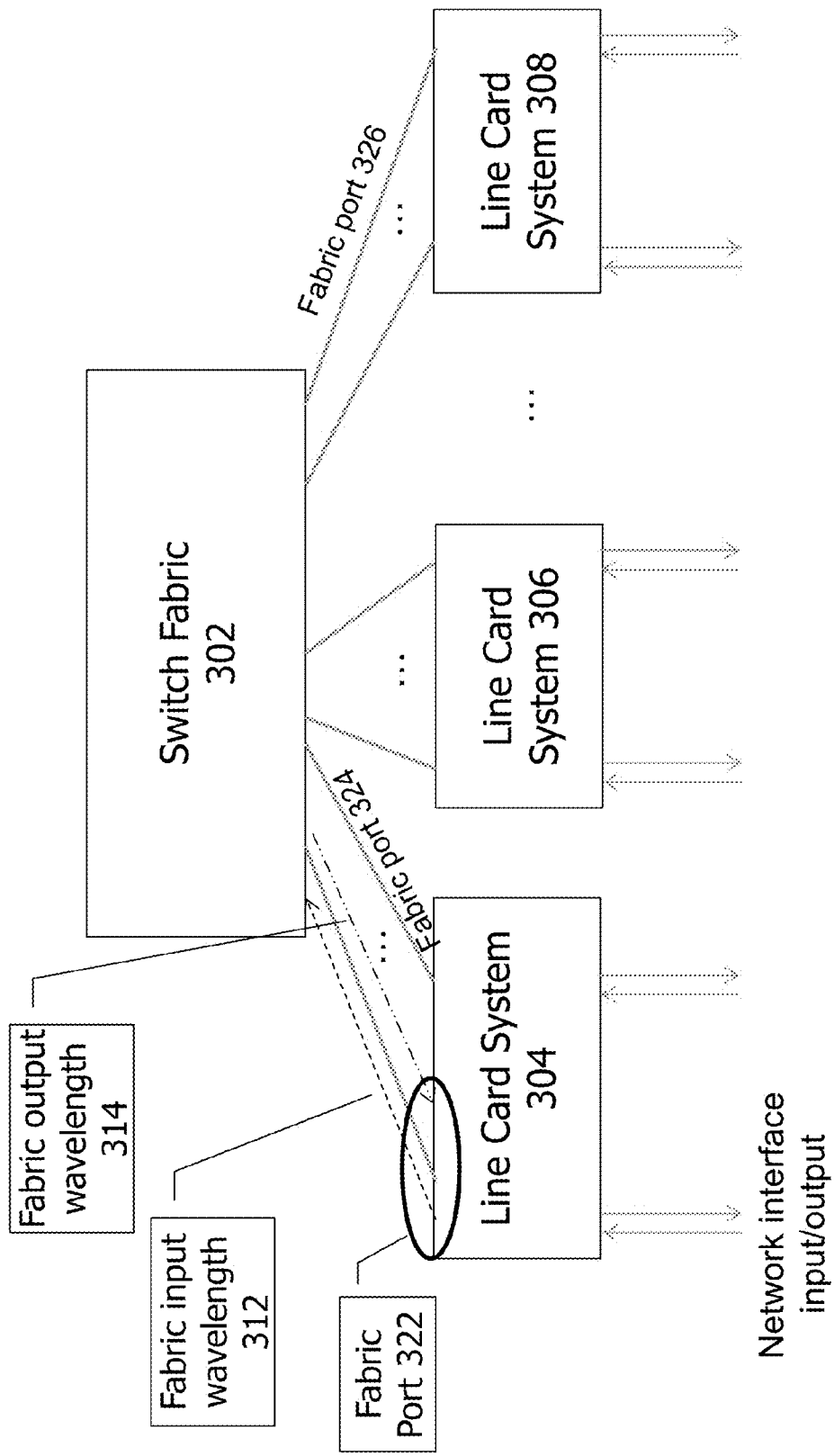
FIG. 3 shows an exemplary separated fabric and line cards where the input/output of fabric port share one fiber.
Figure 4:
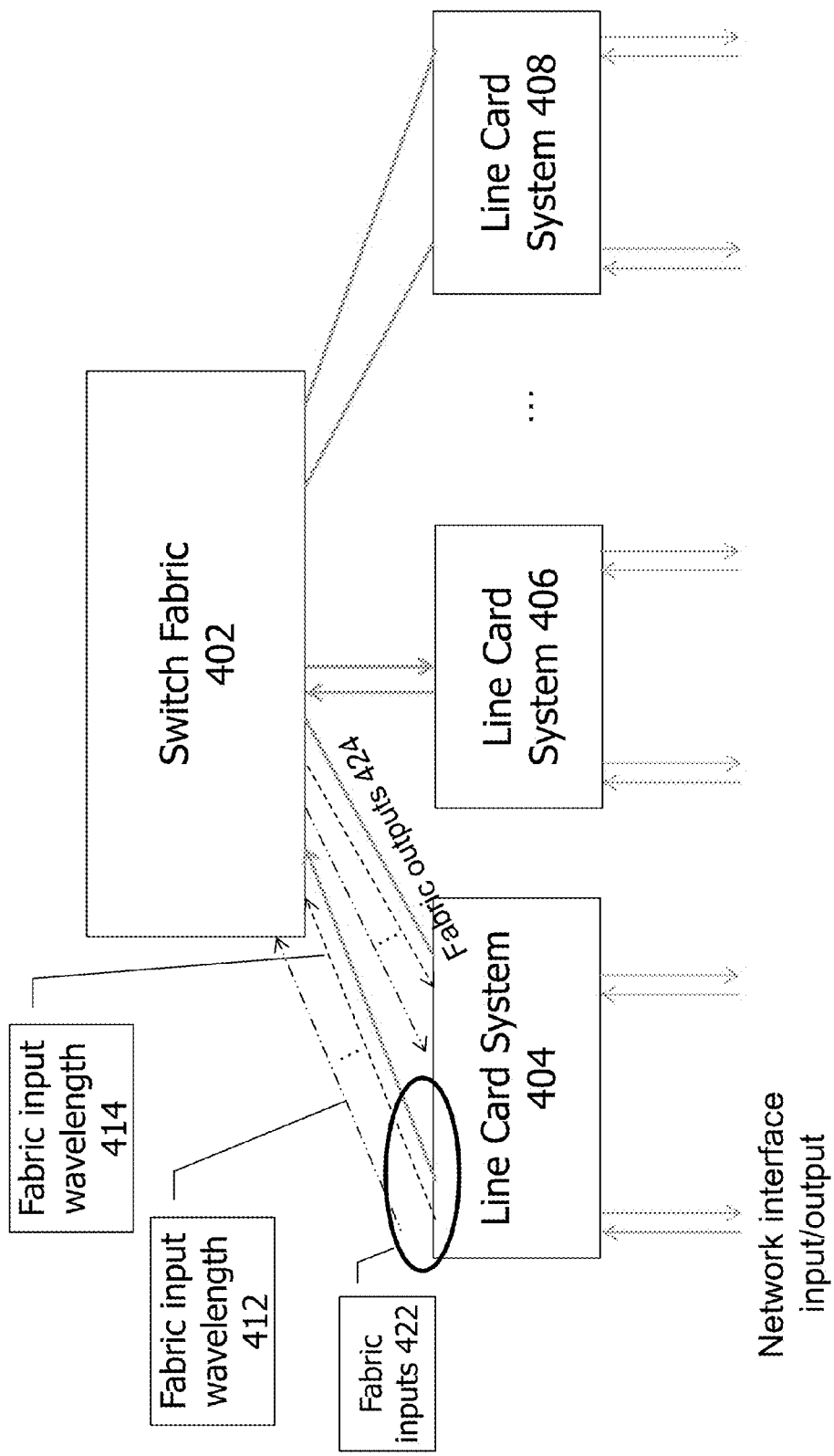
FIG. 4 shows an exemplary separated fabric and line cards where all fabric inputs (or outputs) from one line card system share one fiber

When line card and fabric systems are separated, the output interfaces to the network may be connected directly to the fabric output. For operation convenience, in one embodiment, the output ports of the switch fabric are connected back to the line cards, and then to the output of the network interface through the line cards. In one embodiment, the input and output of each fabric port use one fiber. As given in FIG. 3, fabric port 322 connected to line card system 304 has input wavelength 312 for the line card generated bursts, and output wavelength 314 for the bursts switched to the line card. Inside the line card system, the two wavelengths of each fiber are separated and the output is coupled to the fiber at the network interface. In one embodiment, as given in FIG. 4, all the fabric inputs to one line card system may share the same fiber (like fabric inputs 422, containing wavelength 412 and 414 etc.), and all the fabric outputs may use another fiber (like fabric outputs 424).

Further flexibility and/or cost savings can be achieved by putting the line card's function into the network interface card (NIC) which is plugged in a computer. In this case, the computer (or the NIC) has a routing table for its packets, so it can resolve the destination; it assembles the bursts and requests for bandwidth from the arbitrator directly; and it has a tunable laser to generate the corresponding wavelength for the given destination.

Figure 5:
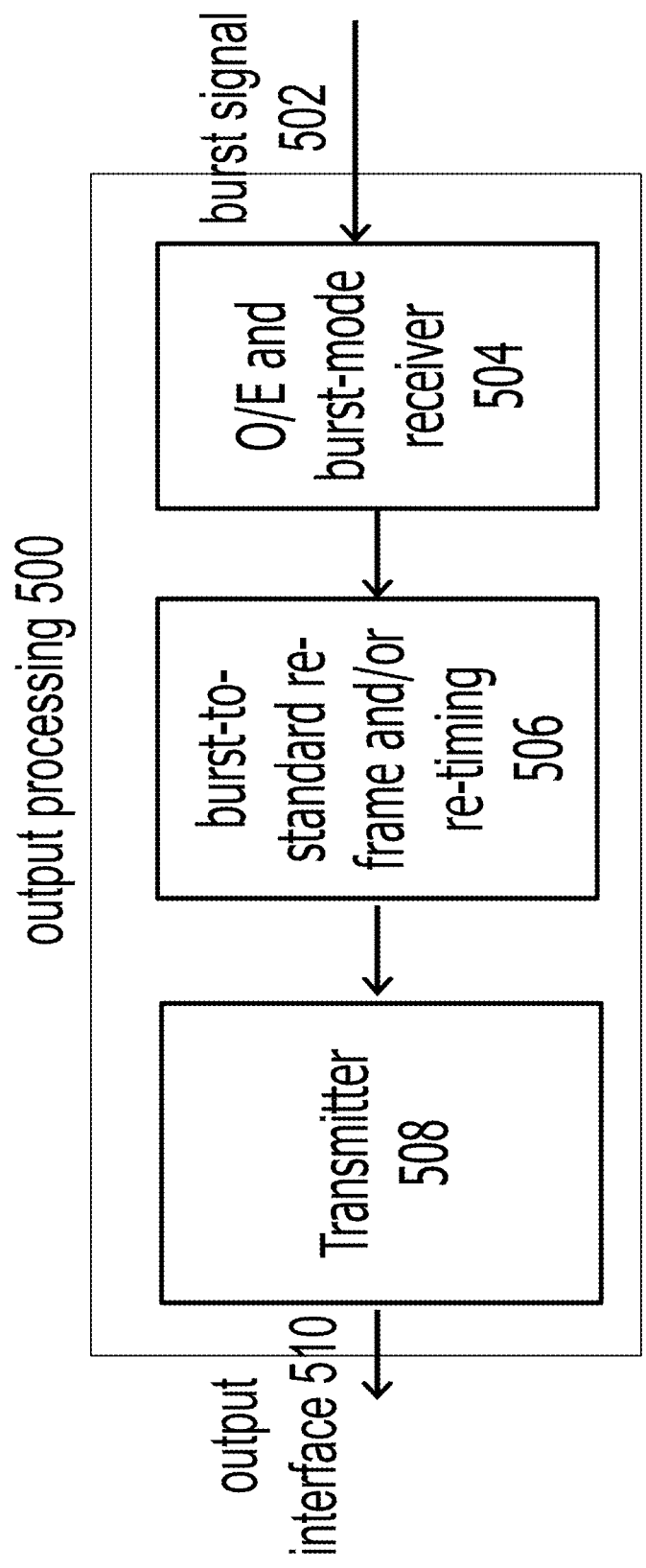
FIG. 5 shows an exemplary system for converting output burst to standard interface.

To provide a standard interface such as 802.3 Ethernet interface, in one embodiment, the output direction of a line card has a mapping and/or retiming module that converts the bursts to the standard signal. As shown in FIG. 5, a burst mode receiver 504 first converts the optical signal into electrical and generates the related clock; burst-to-standard re-framing and/or re-timing module 506 frames/retimes the packets according to the interface standard; then a transmitter 508 sends the signal out in either electrical or optical domain.

The system can also be the hybrid of the traditional architecture and those described above. For packets destined to a standard interface, it follows traditional processing path such as input queuing/scheduling, switching, output queuing and scheduling, output framing etc.; for packets to a burst-mode-capable interface, the aforementioned solutions can be applied.

For applications, the aforementioned system can be used as the ToR (Top of Rack) switch, with standard interfaces connecting to the aggregation switch, and the burst mode interfaces connecting to the NICs that are plugged into the servers. Such system can also be part of the aggregation switch, with burst mode interface connecting to either the ToR switch, or extended connection to the servers directly.

The system is lower-cost, power efficient, and flexible in connection. Optical switching avoids high-speed electrical connection from input/output ports to the switch fabric, and provides long connection distance and the switching scale and physical arrangement is better than electrical switches. There is no need for high power SerDes and the crossbar switch fabric. Additionally, the system has large switching capacity.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. A switching system, comprising:
one or more line card for input processing, forwarding, queuing, and scheduling data, the line card having a tunable laser to select a wavelength according to the packets' destination for a given burst of packets, so that the burst is switched to a desired destination and sent all-optically to a connected interface, wherein each line card includes an input processing module and no output processing module, and wherein each line card performs modification to a destination MAC address in the input processing module;
an all-optical switch fabric coupled to the line card to perform wavelength switching; and
a centralized arbitrator to resolve contention from different input ports, wherein the arbitrator resolves contention for requests to an output port, and sends back granted output port and time slot to each input port and upon receiving a grant for an assigned time slot, tunes an optical transmitter laser to a predetermined wavelength, and reads out packets from a corresponding queue to drive the optical transmitter, wherein the line cards, switch fabric, and centralized arbitrator operate as a router and are physically located in one chassis or rack with predetermined interconnect delay; and a fabric port connected to the line card having an input wavelength for each line card generated bursts, and an output wavelength for bursts switched to the line card, wherein in the line card, the input and output wavelengths of each fiber are separated and the output is coupled to the fiber at the network interface.

2. The system of claim 1, wherein the line card uses grant information from the centralized arbitrator to select the corresponding wavelength and queue.

3. The system of claim 1, wherein the centralized arbitrator grants the fabric access in burst mode and multiple packets are switched during a granted period.

4. The system of claim 1, wherein the arbitrator uses asynchronous scheduling and access from different source ports to the fabric are asynchronous.

5. The system of claim 1, wherein the arbitrator uses synchronous scheduling based on fixed and synchronized time slot.

6. The system of claim 1, wherein a scheduler to considers packet priority in scheduling.

7. The system of claim 1, for a source port without sufficient packets of a predetermined priority to fill-up a time slot, comprising a sub-scheduling module to continue the burst from other priorities.

8. The system of claim 1, wherein the scheduling grants the fabric access in round-robin mode without considering priority.

9. The system of claim 1, comprising a source port has sub-scheduling to distribute the granted bandwidth to different queues.

10. The system of claim 1, wherein the arbitrator grants the fabric access in a way that uses the allocated bandwidth between the source and destination as the weight.

11. The system of claim 1, wherein line cards and an arbitrator/switch-fabric are located in different systems.

12. The system of claim 1, wherein a request/grant is sent from either a separate cable or a different wavelength from the one carrying the data.

13. The system of claim 1, wherein the output network interface is connected to the fabric system.

14. The system of claim 1, wherein the output network interface is connected to the line card system, paired with the input interface.

15. The system of claim 1, wherein fabric input and output of each port are transmitted through the same fiber.

16. The system of claim 1, wherein fabric inputs from the same line card are transmitted through a preselected fiber and fabric outputs to the same line card are transmitted through the preselected fiber.

17. The system of claim 1, comprising a network interface card (NIC) to interface with the fabric system to resolve a destination, request fabric access from centralized arbitrator, generate a predetermined wavelength using a tunable laser for an assembled bursts, and receive bursts of packets.

18. The system of claim 1, wherein the network interface complies with existing network interface standard.

19. The system of claim 1, wherein the line card has a re-framing or retiming module adapter to convert from burst mode to the standard-based interface.

20. The system of claim 1, comprising a hybrid switch that uses electrical switching and the all-optical burst mode switching, wherein packets to standard interfaces follow the traditional path while packets to burst-mode interfaces follow an all-optical path.

* * * * *